US008675006B2

(12) United States Patent
Ford et al.

(10) Patent No.: US 8,675,006 B2
(45) Date of Patent: Mar. 18, 2014

(54) APPARATUS AND METHOD FOR COMMUNICATING BETWEEN A CENTRAL PROCESSING UNIT AND A GRAPHICS PROCESSING UNIT

(75) Inventors: Simon Andrew Ford, Cambridge (GB); Sean Tristram Ellis, Farnham (DE); Edward Charles Plowman, Gamlingay (GB)

(73) Assignee: ARM Limited, Cambridge (GB)

( * ) Notice: Subject to any disclaimer, the term of this patent is extended or adjusted under 35 U.S.C. 154(b) by 1145 days.

(21) Appl. No.: 12/461,418

(22) Filed: Aug. 11, 2009

(65) Prior Publication Data

US 2010/0045682 A1 Feb. 25, 2010

(30) Foreign Application Priority Data

Aug. 22, 2008 (GB) .................................. 0815442.9

(51) Int. Cl.
G06F 15/167 (2006.01)
G06F 1/20 (2006.01)
G06F 13/14 (2006.01)
G06T 1/60 (2006.01)

(52) U.S. Cl.
USPC ............ 345/541; 345/506; 345/520; 345/530

(58) Field of Classification Search
USPC ........................................................ 345/541
See application file for complete search history.

(56) References Cited

U.S. PATENT DOCUMENTS

| 6,182,203 B1* | 1/2001 | Simar et al. ..................... 712/22 |
| 6,985,152 B2* | 1/2006 | Rubinstein et al. ............ 345/520 |
| 7,284,114 B2* | 10/2007 | Arnold et al. .................... 712/36 |
| 7,366,878 B1* | 4/2008 | Mills et al. ...................... 712/214 |
| 7,697,007 B1* | 4/2010 | Duluk, Jr. ....................... 345/522 |
| 2007/0273699 A1* | 11/2007 | Sasaki et al. .................. 345/502 |
| 2008/0104271 A1* | 5/2008 | Hicok et al. ................... 709/238 |

FOREIGN PATENT DOCUMENTS

| JP | 10-105154 | 4/1998 |
| JP | 10-289120 | 10/1998 |
| JP | 2003-529151 | 9/2003 |
| WO | WO 01/73571 | 10/2001 |

OTHER PUBLICATIONS

Search Report for GB0815442.9, date of search Nov. 6, 2008.
D. Blythe, "Rise of the Graphics Processor", *Proceedings of the IEEE*, vol. 96, No. 5, May 2008, pp. 761-778.
List of cited references from JP Office Action dated Apr. 16, 2013 in JP 2009-190869.
English translation of Japanese Office Action dated Apr. 16, 2013 in JP 2009-190869.

* cited by examiner

*Primary Examiner* — Ulka Chauhan
*Assistant Examiner* — Sae Won Yoon
(74) *Attorney, Agent, or Firm* — Nixon & Vanderhye P.C.

(57) ABSTRACT

A shared memory is provided accessible by a central processing unit and a graphics processing unit. A bus is provided via which the central processing unit, graphics processing unit and shared memory communicate. A first mechanism controls the graphics processing unit and the central processing unit routes control signals via the bus. An interface is provided between the central processing unit and the graphics processing unit, and an additional mechanism controls the graphics processing unit and the central processing unit provides control signals over the interface. This enables the GPU to continue to be used to handle large batches of graphics processing operations loosely coupled with the operations performed by the CPU, and it is also possible to employ the GPU to perform processing operations on behalf of the CPU in situations where those operations are tightly coupled with the operations performed by the CPU.

19 Claims, 9 Drawing Sheets

APPARATUS AND METHOD FOR COMMUNICATING BETWEEN A CENTRAL PROCESSING UNIT AND A GRAPHICS PROCESSING UNIT

This application claims priority to GB Application No. 0815442.9 filed 22 Aug. 2008, the entire contents of which are incorporated herein by reference.

FIELD OF THE INVENTION

The present invention relates to an apparatus and method for communicating between a central processing unit and a graphics processing unit, and in particular relates to techniques that enable the central processing unit to make more effective use of the resources of the graphics processing unit.

BACKGROUND OF THE INVENTION

Graphics processing units (GPUs) are typically designed to facilitate fast and efficient execution of common graphics processing operations, for example geometric processing functions such as dot, cross and matrix product calculations on vector inputs. Since GPUs are typically optimised for such operations, they can typically complete these tasks much faster than a central processing unit (CPU) even if such a CPU includes SIMD (single instruction multiple data) hardware.

In a typical system-on-chip (SoC) environment, a CPU and a GPU may be coupled together via a bus infrastructure, with shared memory being utilised as a mechanism for the CPU to setup batches of operations to be performed by the GPU. Such a known arrangement is shown in FIG. 1, where a CPU 10 is coupled with a GPU 20 via a bus network 30, with shared memory 40 also being coupled to the bus network 30. It will be appreciated that the bus network 30 may incorporate one or more separate buses, and the shared memory 40 may or may not include one or more levels of cache.

The manner in which the CPU can setup a batch of operations for execution by the GPU is shown schematically by the arrows numbered 1 through 4 in FIG. 1, with the sequence of steps being illustrated in more detail by the flow diagram of FIG. 2. In particular, as indicated by arrow 1, and discussed at step 100 in FIG. 2, the CPU first stores one or more data structures to the shared memory 40. As will be understood by those skilled in the art, each data structure will have a predetermined format understood by both the CPU and the GPU, and the actual data provided within the data structure may identify not only data values on which the GPU is to operate, but may also identify instructions defining the graphics processing operations to be performed by the GPU. It will also be understood that whilst the instructions and data values may be specified directly in the data structure, the data structure may also include one or more pointers identifying memory addresses at which certain instructions and/or data values may be found.

As shown by the arrow 2 in FIG. 1, and illustrated by step 105 in FIG. 2, the CPU, in addition to storing one or more data structures in the shared memory, will also typically write various control information into one or more memory mapped control registers 25 within the GPU 20. Since the control registers 25 are memory mapped, they can be accessed directly by the CPU over the bus network 30 by the CPU issuing access requests specifying the relevant memory addresses. Via this route, certain basic control parameters of the GPU can be set under the control of the CPU 10. Typically, one of the control registers 25 will have a value stored therein identifying at least one data structure in shared memory to be accessed by the GPU in order to begin processing of the batch of graphics processing operations.

Once the memory mapped control registers have been set, and the relevant data structure(s) have been stored in the shared memory 40, the GPU will then begin its operation, using the information in the memory mapped control registers in order to begin retrieving the relevant data structure(s) from shared memory 40. As shown by arrow 3 in FIG. 1, and illustrated by step 110 in FIG. 2, this will cause the GPU to perform the required graphics processing operations as defined by the data structure(s), and typically the results will be stored back to shared memory 40 starting at a predetermined address.

When the GPU 20 completes performance of the batch of operations specified by the data structure(s), it will issue an interrupt to the CPU over the IRQ path 50, as shown by the arrow 4 in FIG. 1 and illustrated by step 115 in FIG. 2. On receipt of the interrupt, the CPU 10 will typically execute an interrupt service routine (ISR) in order to retrieve the result data from shared memory 40, whereafter that result data can be used by the CPU during the performance of subsequent operations by the CPU.

For common graphics processing operations, the GPU 20 can typically achieve a much higher throughput than would be the case if those operations were instead performed on the CPU 10, and hence the use of the GPU can significantly increase performance of the overall system. However, with reference to the above description of FIGS. 1 and 2, it will be appreciated that there is a significant setup time involved in setting up the operations to be performed by the GPU, due to the need to communicate through the construction of data structures created in shared memory, along with the need to program up the necessary memory mapped control registers 25 of the GPU 20. This high latency is not generally considered an issue for normal graphics operations that can be formed into sufficiently large enough batches for the high latencies involved to be compensated for by the throughput performance benefit achieved by offloading that work from the CPU to the GPU.

However, there are other operations currently performed by the CPU that could potentially be performed efficiently by the GPU, but where the high latency involved in setting up the GPU to perform the operations makes it impractical to use the GPU. For example, it is common during the execution of graphics and gaming code on the CPU that relatively small pieces of code are repeated multiple times in sections of the inner loops of program code, examples being in physics based animation, artificial intelligence code for path finding in 3D worlds, or determining visible objects for artificial intelligence constructs. The execution of such code is typically time critical. Whilst the operations or groups of operations defined by such code could in principle be accelerated by the use of the GPU, they tend to comprise relatively small code sections (in terms of the number of GPU operations that would be required once the code has been mapped to the GPU) and involve relatively small amounts of data (for example one or two matrices and a number of vectors). Typically, it is difficult to arrange for these operations to be performed in sufficiently large batches to overcome the latencies involved in writing out data structures to shared memory, having the GPU perform the necessary operations followed by the issuance of an interrupt, and then have the CPU respond to the interrupt in order to read the relevant results.

Such factors tend to prohibit the CPU taking advantage of the GPU's processing capabilities for the above types of operations, particularly since the CPU is often unable in such instances to compensate for the high latency introduced by using the GPU (the CPU code following the offloaded operation, or group of operations, will typically be heavily dependent on the result of the offloaded operations).

However, for the types of graphics processing operations that the GPU is traditionally used for, it is observed that the available hardware resources of the GPU are not fully utilised all of the time, and hence the GPU is likely to have spare processing capacity.

Accordingly, it would be desirable to provide an improved technique for communication between the CPU and the GPU, which allows the GPU to continue to perform existing graphics processing operations, but also facilitated the offloading of other, less latency tolerant, operations to the GPU.

SUMMARY OF THE INVENTION

Viewed from a first aspect, the present invention provides a data processing apparatus comprising: a central processing unit for executing a stream of instructions; a graphics processing unit for performing graphics processing operations on behalf of the central processing unit; shared memory accessible by the central processing unit and the graphics processing unit via which data structures are shareable between the central processing unit and the graphics processing unit; a bus via which the central processing unit, graphics processing unit and shared memory communicate, the central processing unit routing control signals via the bus as a first mechanism for controlling the graphics processing unit; and an interface between the central processing unit and the graphics processing unit, the central processing unit providing control signals over the interface as an additional mechanism for controlling the graphics processing unit.

In accordance with the present invention, the CPU is provided with two separate mechanisms for controlling the GPU. In accordance with the first mechanism, control signals can be routed via a bus interconnecting the CPU, GPU and shared memory, allowing the GPU to be controlled in the standard manner. However, additionally, an interface is provided between the CPU and the GPU, and control signals may be provided directly over the interface as an additional mechanism for controlling the graphics processing unit. By providing the two separate mechanisms, significantly improved flexibility is provided with respect to the controlling of the GPU by the CPU. For large batch jobs where the high latency involved in the setup stage is more than compensated for by the improved throughput resulting from the use of the GPU, the first mechanism may be used, with control signals being routed over the bus between the CPU and the GPU, and with the required data structures being established in shared memory. For smaller tasks where the latencies involved with the use of the first mechanism make use of the first mechanism prohibitive, and/or where the tasks themselves are latency intolerant (for example when those tasks relate to operations within a time critical bit of code executing on the CPU), then the interface between the CPU and the GPU may be used as a direct mechanism for providing control signals to the GPU.

Accordingly, through use of the additional mechanism of the present invention, this provides a technique for the CPU to use the GPU resources with reduced latency and higher efficiency, for the performance of operations which are significantly less latency tolerant than those operations traditionally offloaded to the GPU.

In one embodiment, the first mechanism is used to control the graphics processing unit to perform graphics processing operations which are loosely coupled with operations performed by the central processing unit, and the additional mechanism is used to control the graphics processing unit to perform processing operations which are tightly coupled with operations performed by the central processing unit. Loosely coupled operations can be considered to be those operations where the timing of the availability of the results of those operations is not time critical to the CPU, as is typically the case for the standard graphics processing operations traditionally offloaded to the GPU as large batches of operations. In contrast, tightly coupled operations are those where the timing of the availability of the results is critical to the CPU and any significant delay in the availability of those results would significantly impact the performance of the CPU.

It should be noted that the operations that are offloaded to the GPU from the CPU using the interface of the additional mechanism of the present invention need not be graphics processing operations, but instead can be any operations which can efficiently be performed using the hardware resources of the GPU. Examples include game physics, route finding, particle simulation (e.g. smoke, fire, etc), fluid flow simulation, certain types of audio effects or signal processing, etc.

There are a number of ways in which the control signals may be provided over the interface when employing the additional mechanism of the present invention. In one embodiment, the control signals provided over the interface actually comprise one or more instructions to be executed by the graphics processing unit.

In one particular embodiment, the instructions provided over the interface in such a manner are actually contained within the stream of instructions executed by the CPU, and are recognised by the CPU as instructions to be handled by the graphics processing unit. Often an indication of the GPU instruction will also pass through the CPU pipeline with one or more handshaking signals passing between the CPU and the GPU via the interface during the execution of the GPU instruction within the GPU.

In one particular embodiment, the GPU instructions recognised by the CPU may be coded into an unused corner of the CPU's instruction set, such that any given instruction will be identified as either a CPU instruction or a GPU instruction, but not both. However, in an alternative embodiment, instructions can be included in the instruction stream to cause the CPU to change its mode of operation, this allowing the same instruction coding to be re-used, but with that instruction coding meaning different things to the CPU and the GPU.

For example, in one embodiment, prior to providing said one or more instructions over said interface, the central processing unit executes a switch instruction to switch from an instruction set used by the central processing unit to an instruction set used by the graphics processing unit, such that subsequent instructions in said stream are interpreted as instructions to be handled by the graphics processing unit. Hence, the executing of the switch instruction by the CPU causes the CPU to interpret the following instructions as GPU instructions, and to thereby provide those instructions over the interface to the GPU. Often the switch instruction will take the form of a particular type of branch instruction which will cause a particular sequence of GPU instructions to then be executed, whereafter the mode of operation will switch back to the normal CPU mode to enable the CPU to continue executing CPU instructions.

The instructions provided over the interface when employing the additional mechanism may take a variety of forms. For example, in one embodiment at least one of those instructions may provide a pointer to one or more data structures in shared memory. Hence, in such embodiments, an instruction may be directly injected from the CPU to the GPU over the interface, but with the data values then operated on, and optionally identification of the operations to be performed, then being provided by one or more data structures in the shared memory.

However, whilst shared memory may still be utilised when using the additional mechanism of the present invention, there is no requirement to use shared memory. In one embodiment, at least one of the instructions provided over the interface may, when executed on the GPU, cause data to be passed between a register file of the CPU and a register file of the GPU. Hence, in this embodiment, both the CPU and the GPU maintain separate register files, and the data may be routed over the interface between the respective register files. Alternatively, as will be discussed in more detail later, the CPU and GPU may be arranged to share a register file with the CPU identifying to the GPU which registers within the register file are to be used by the GPU when performing any particular operations on behalf of the CPU.

Further, in one embodiment, at least one of the instructions provided over the interface when using the additional mechanism may specified a data processing operation to be performed by the graphics processing unit. Hence, in such embodiments, at least some of the instructions will identify the actual operations to be executed by the GPU, and hence for example may identify arithmetic operations, control flow operations, logical operations, comparison operations, masking operations, etc.

As an alternative to routing instructions over the interface, in an alternative embodiment the control signals provided over the interface when employing the additional mechanism may result from execution of at least one instruction by the CPU.

In one particular embodiment, the control signals provided in such a manner may provide a pointer to one or more data structures in said shared memory defining the processing operations to be performed by the graphics processing unit. Hence, in such embodiments, the execution of one or more instructions within the CPU may cause control signals to be directly provided to the GPU via the interface to initiate operations on the GPU, with reference to one or more data structures in shared memory.

In one embodiment, the central processing unit and graphics processing unit are arranged to share a register file and said control signals provided over the interface when employing the additional mechanism specify one or more of the registers of the shared register file to be used by the graphics processing unit when performing processing operations defined by said control signals. This can provide a particularly efficient mechanism for the sharing of data between the CPU and the GPU.

In one such embodiment, the central processing unit is arranged to identify in scoreboard circuitry those registers specified in the control signals as being for use by the graphics processing unit, to prevent those register being used by the central processing unit whilst the graphics processing unit is performing the processing operations defined by said control signals. Hence, by such a mechanism, particular registers can be reserved for use by the graphics processing unit, and on completion of the relevant processing operations by the graphics processing unit, those registers can then be released for re-use by the central processing unit.

By using the scoreboard circuitry, the CPU can be allowed to continue operation whilst awaiting completion of the offloaded operations by the GPU. However, in embodiments where the CPU stalls awaiting the results from the GPU, the scoreboard circuitry may not be required to be used as discussed above.

In one embodiment, whilst the graphics processing unit is performing processing operations defined by said control signals provided over the interface in accordance with the additional mechanism, the central processing unit continues to execute instructions that are not dependent on the results of said processing operations performed by the graphics processing unit.

However, it is envisaged that the types of operations offloaded to the GPU through the use of the interface of the additional mechanism will often be operations where the CPU will require the results of those operations before any significant further progress can be made by the CPU. Accordingly, in one embodiment, following the provision of said control signals over the interface in accordance with the additional mechanism, the central processing unit halts its execution of instructions until the results of the processing operations performed by the graphics processing unit in response to said control signals are available to the central processing unit.

In one embodiment, the graphics processing unit supports multi-threaded execution, and comprises a scheduler for scheduling threads within the graphics processing unit. In one such embodiment, upon receipt by the graphics processing unit of any control signals provided from the central processing unit via the interface, the scheduler is arranged to schedule at least one thread for the processing operations associated with those control signals. In certain embodiments of the present invention, this can provide a mechanism for controlling the transition from execution of application code on the CPU to execution of that application code on the GPU, and back again, via a single execution thread.

In one embodiment, the scheduler is arranged to give higher priority to any thread associated with said control signals received via the interface than the priority given to other threads. Where the operations offloaded to the GPU through use of the additional mechanism are operations tightly coupled with the operations performed by the CPU, this provides a mechanism for ensuring that those offloaded operations are performed as quickly as possible within the GPU, thereby minimising latency.

In one embodiment, the scheduler is arranged to schedule any thread associated with said control signals received via the interface in a manner seeking to utilise any free computation capabilities of the graphics processing unit. In accordance with this embodiment, the aim is to accommodate the operations offloaded to the GPU via the additional mechanism in a way which does not impact on the bulk of the processing performed by the GPU, which is still expected to be initiated by the first mechanism. Hence, the GPU maintains its ability to execute loosely coupled operations, but incorporates any additional operations routed via the additional mechanism in a manner seeking to utilise the unused computation capabilities of the GPU. In many situations, this may still meet the timing required by the CPU, since through use of the additional mechanism, the high latency involved in the setup time when using the first mechanism will have been avoided, and hence assuming free computation capabilities of the GPU arise frequently, this approach can provide a sufficiently fast turnaround time for the operations offloaded to the GPU via the additional mechanism.

Of course, in some embodiments, this approach can be combined with an approach where some form of higher priority is given to operations routed via the interface of the additional mechanism. For example, such an approach may enable the scheduler to initially seek to allocate any thread associated with the control signals received via the interface to free computational resources of the GPU, but if after a predetermined period of time that has not been possible, then that thread will be given a high priority to ensure it is scheduled as soon as possible thereafter.

In one embodiment, when employing the first mechanism, the control signals routed via the bus cause control values to be written into memory-mapped control registers of the graphics processing unit in order to control the graphics processing unit. Hence, in such embodiments, the first mechanism relies on address based routing of control signals, in contrast to the additional mechanism of the present invention where the interface between the CPU and the GPU allows the direct provision of control signals from the CPU to the GPU.

Viewed from a second aspect, the present invention provides a data processing apparatus comprising: a central processing means for executing a stream of instructions; a graphics processing means for performing graphics processing operations on behalf of the central processing means; shared memory means, accessible by the central processing means and the graphics processing means, for sharing data structures between the central processing means and the graphics processing means; bus means for communication between the central processing means, graphics processing means and shared memory means, the central processing means for routing control signals via the bus means as a first mechanism for controlling the graphics processing means; an interface means between the central processing means and the graphics processing means, the central processing means for providing control signals over the interface means as an additional mechanism for controlling the graphics processing means.

Viewed from a third aspect, the present invention provides a method of operating a data processing apparatus comprising a central processing unit for executing a stream of instructions, and a graphics processing unit for performing graphics processing operations on behalf of the central processing unit, the method comprising the steps of: employing shared memory accessible by the central processing unit and the graphics processing unit in order to share data structures between the central processing unit and the graphics processing unit; providing a bus via which the central processing unit, graphics processing unit and shared memory communicate; routing control signals from the central processing unit via the bus as a first mechanism for controlling the graphics processing unit; providing an interface between the central processing unit and the graphics processing unit; and providing control signals from the central processing unit over the interface as an additional mechanism for controlling the graphics processing unit.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
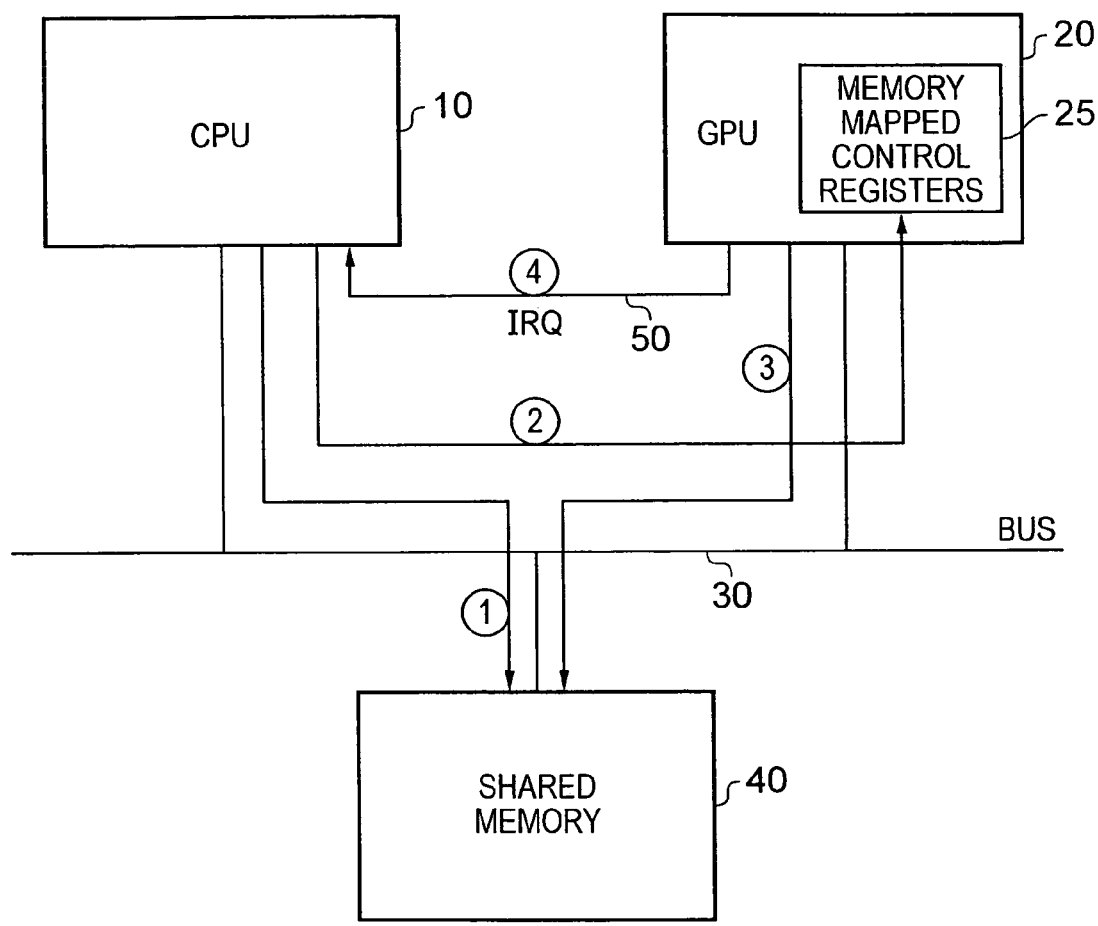
FIG. 1 is a diagram schematically illustrating the coupling of a CPU and a GPU in accordance with a known arrangement.
Figure 2:
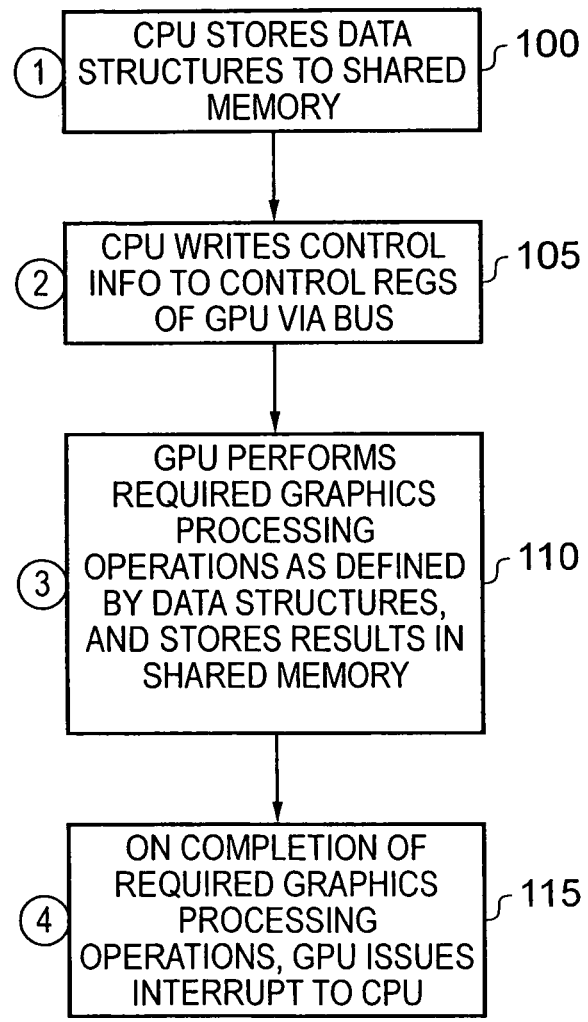
FIG. 2 is a flow diagram illustrating the operation of the apparatus shown in FIG. 1.
Figure 3A:
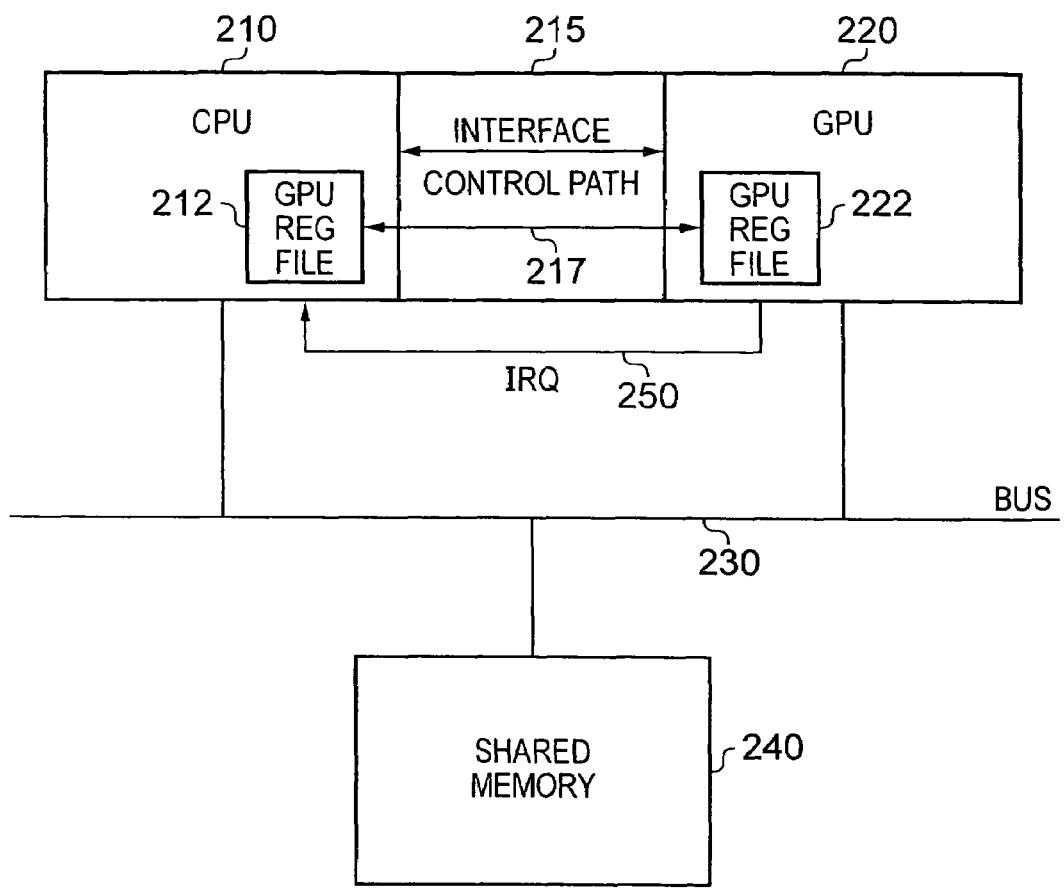
FIG. 3A is a diagram schematically illustrating a data processing apparatus in accordance with one embodiment of the present invention.

FIG. 3A is a block diagram schematically illustrating a data processing apparatus in accordance with one embodiment of the present invention. In one particular embodiment, the data processing apparatus takes the form of a System-on-Chip (SoC). In an analogous manner to the prior art of FIG. 1, a CPU 210 and a GPU 220 are coupled to a bus network 230, with shared memory 240 also being coupled to the bus network. The bus network 230 may incorporate one or more separate buses, and the shared memory 240 may or may not include one or more levels of cache.

In accordance with a first mechanism for controlling the GPU, the CPU 210 may store one or more data structures in the shared memory 240, and via the bus 230 may additionally access one or more memory mapped control registers within the GPU so as to write various control values into the GPU in order to initiate performance of a sequence of graphics processing operations by the GPU. As with the early prior art example of FIG. 1, when such a mechanism is used, an interrupt may be issued from the GPU over path 250 to the CPU on completion of the required tasks by the GPU.

However, in accordance with the embodiment of the present invention shown in FIG. 3A, an interface 215 is also provided between the CPU 210 and the GPU 220 to provide an alternative, direct, mechanism for controlling the GPU. When this alternative mechanism is employed, the CPU 210 issues one or more control signals over a control path 215 within the interface, which on receipt by the GPU cause the GPU to schedule one or more processing operations for execution within the GPU in addition to any operations already being scheduled as a result of use of the earlier described first mechanism.

By providing these two distinct and separate mechanisms for controlling the GPU, significantly improve flexibility is provided. In particular, for large batch jobs where the high latency involved in the setup stage (programming up the required control registers of the GPU and storing the required data structures to shared memory) is more than compensated for by the improved throughput resulting from the use of the GPU, the traditional, first, mechanism is used. However, for smaller tasks where the latency involved with the use of the first mechanism make that mechanism prohibitive, and/or where the tasks themselves are latency intolerant, then the interface 215 between the CPU 210 and the GPU 220 may be used as a direct mechanism for providing control signals to the GPU.

When using the interface 215 of embodiments of the present invention, there are a number of techniques that may be used to manage the transfer of data between the CPU and the GPU during the performance of the required operations by the GPU. Whilst in some instances it may still be appropriate to use the shared memory 240, and in particular one or more data structures stored within the shared memory, in order to pass data between the CPU and the GPU, the required data values to be processed by the GPU may instead be passed directly between the CPU and the GPU via the interface 215.

In the embodiment shown in FIG. 3A, both the CPU 210 and the GPU 220 may have there own respective register files 212, 222, respectively, and data may be moved from the CPU register file 212 to the GPU register file 222 over path 217 as and when required during the performance of the relevant data processing operations on the GPU 220, responsive to the control signals sent from the CPU to the GPU over the control path of the interface 215. Similarly, the result data produced by the GPU may be stored back to the CPU register file 212 from the GPU register file 222 via the path 217 for subsequent reference by the CPU 210.

Figure 3B:
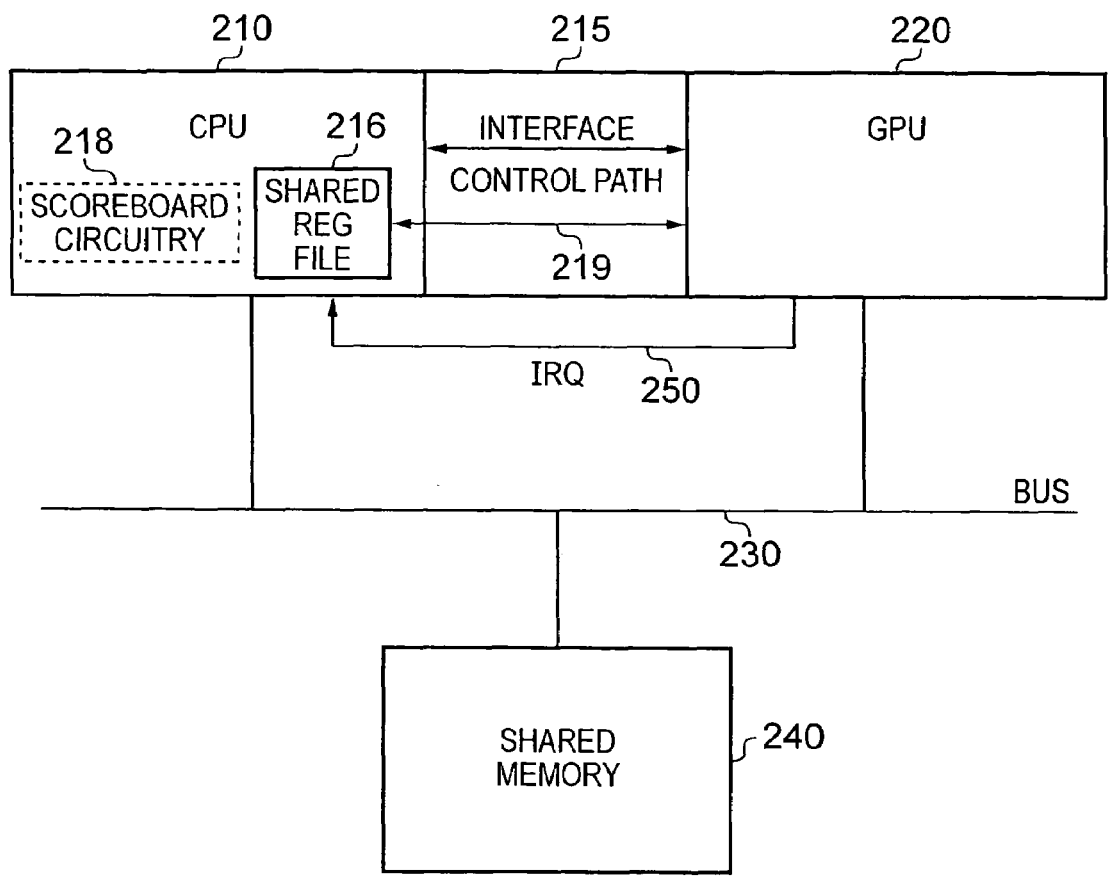
FIG. 3B is a diagram schematically illustrating a data processing apparatus in accordance with an alternative embodiment of the present invention.

FIG. 3B illustrates an alternative embodiment of the present invention. The embodiment is similar to that discussed earlier with reference to FIG. 3A, but in the embodiment of FIG. 3B, a shared register file 216 is provided within the CPU 210, and the GPU 220 does not have its own separate register file. In accordance with this embodiment, the control signals issued from the CPU 210 to the GPU 220 over the control path of the interface 215 can be arranged to specify one or more registers of the shared register file 216 that are to be used by the GPU 220 when performing the required operations initiated by the CPU via the interface 215. The GPU 220 can then access those particular registers via the path 219, and in particular the shared register file 216 will be accessible to the data path execution pipelines of the GPU 220 during the execution of the required operations.

In one embodiment, when the CPU 210 uses the interface mechanism to initiate certain tasks on the GPU 220, the CPU 210 then stalls awaiting the results back from the GPU. However, in an alternative embodiment the CPU 210 may be arranged to continue execution of any instructions which are not dependent on the results produced by the GPU. In that event, optional scoreboard circuitry 218 may be provided, and is used to identify those registers that have been specified for use by the GPU, in order to prevent those registers being used by the CPU whilst the GPU is in the process of performing the operations that require access to those registers. The registers are then released for use by the CPU when the GPU indicates that it has completed the required operations.

Figure 4:
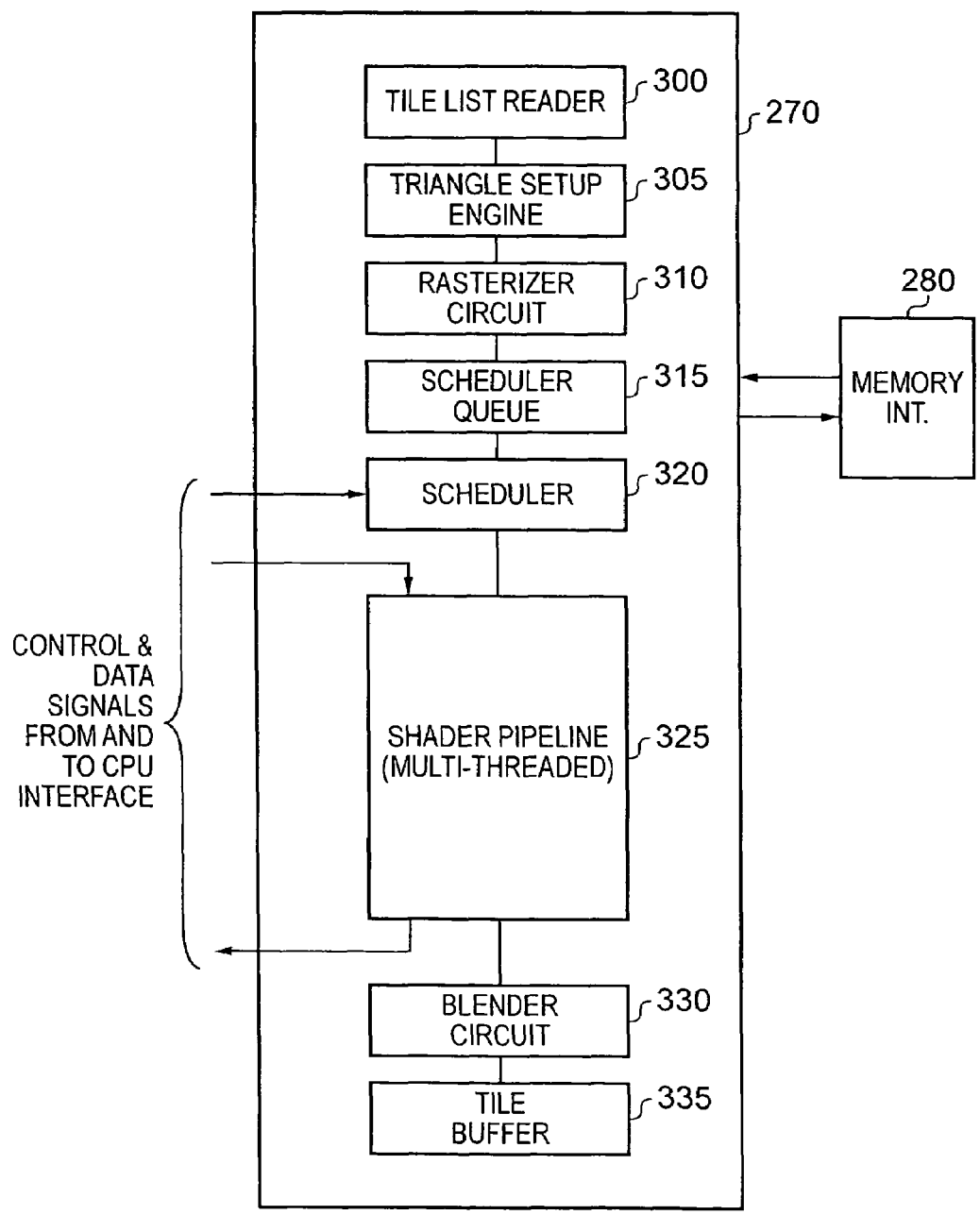
FIG. 4 is a block diagram illustrating components provided within an execution pipeline of the GPU of FIG. 3A or 3B in accordance with one embodiment of the present invention.

The GPU will typically include one or more pipelined execution units optimised for performing particular graphics processing operations. One such execution unit is shown in FIG. 4. In particular, FIG. 4 illustrates those components of the GPU 220 that may be used to constitute an execution unit 270 for generating pixel values from triangle data obtained from shared memory. The execution unit 270 will have access to the shared memory 240 via the memory interface 280, and following setup of the GPU 220 by the CPU 210 using the previously described first mechanism, may be arranged to perform the following sequence of operations.

Firstly the tile list reader 300 will be arranged to access the shared memory 240 via the memory interface 280 in order to read one or more data structures representing triangle data for each screen tile. The triangle setup engine 305 will then process the data structures in order to convert those data structures into a list of triangles to be rasterized (i.e. turned into pixels). The rasterizer circuit 310 then determines all of the pixels that need to be calculated to form each triangle. Thereafter, those pixels that need to be calculated are placed in the scheduler queue 315 (which in one embodiment may be arranged as a FIFO queue).

A scheduler circuit 320 is then used to control the shader pipeline 325, which will typically be arranged as a multi-threaded pipeline. In particular, the scheduler controls the shader pipeline by scheduling and re-scheduling pixel shader programs in order to perform the necessary pixel calculations for each of the pixels in the scheduler queue. When a pixel shader program is scheduled for a particular pixel retrieved from the scheduler queue, that pixel shader program is then run within the shader pipeline 325, and after one or more passes through the shader pipeline that program will then have calculated a pixel colour for the relevant pixel.

The blender circuit 330 is then used to blend the calculated pixel with existing ones, whereafter the output is passed to a tile buffer 335 used to collect the pixels calculated for the screen tile. Typically, the above operation of the GPU will be setup by the CPU using the traditional, first, mechanism, the CPU providing a large amount of triangle data for processing, via one or more data structures stored in shared memory. The large setup time involved in storing the required data structures in shared memory, and writing to the relevant memory mapped control registers of the GPU 220 via the bus 230, is more then compensated for by the high throughput achieved by the GPU 220 when performing the above described operations.

However, in accordance with embodiments of the present invention, it has been realised that even when performing such large batch job processing, there will still be periods of time where some of the hardware resources of the GPU are under utilised, and which could beneficially be used by the CPU for other purposes if they could be accessed efficiently. For example, there may be processing resources within the shader pipeline 325 which can be used by the CPU to perform certain operations if those resources can be accessed with minimal latency by the CPU.

In accordance with embodiments of the present invention, the CPU 210 is arranged to use the additional control mechanisms provided by the interface 215 in order to enable such operations to be offloaded to the GPU 220. Hence, considering the example of the shader pipeline 325, the scheduler 320 can be arranged to receive control signals routed from the CPU to the GPU over the interface 215, and indeed certain control signals can also be routed into the shader pipeline along with any required data signals identifying the data to be processed. Similarly, the shader pipeline may output data and related signals back to the CPU over the interface 215 as shown in FIG. 4.

Figure 5A:
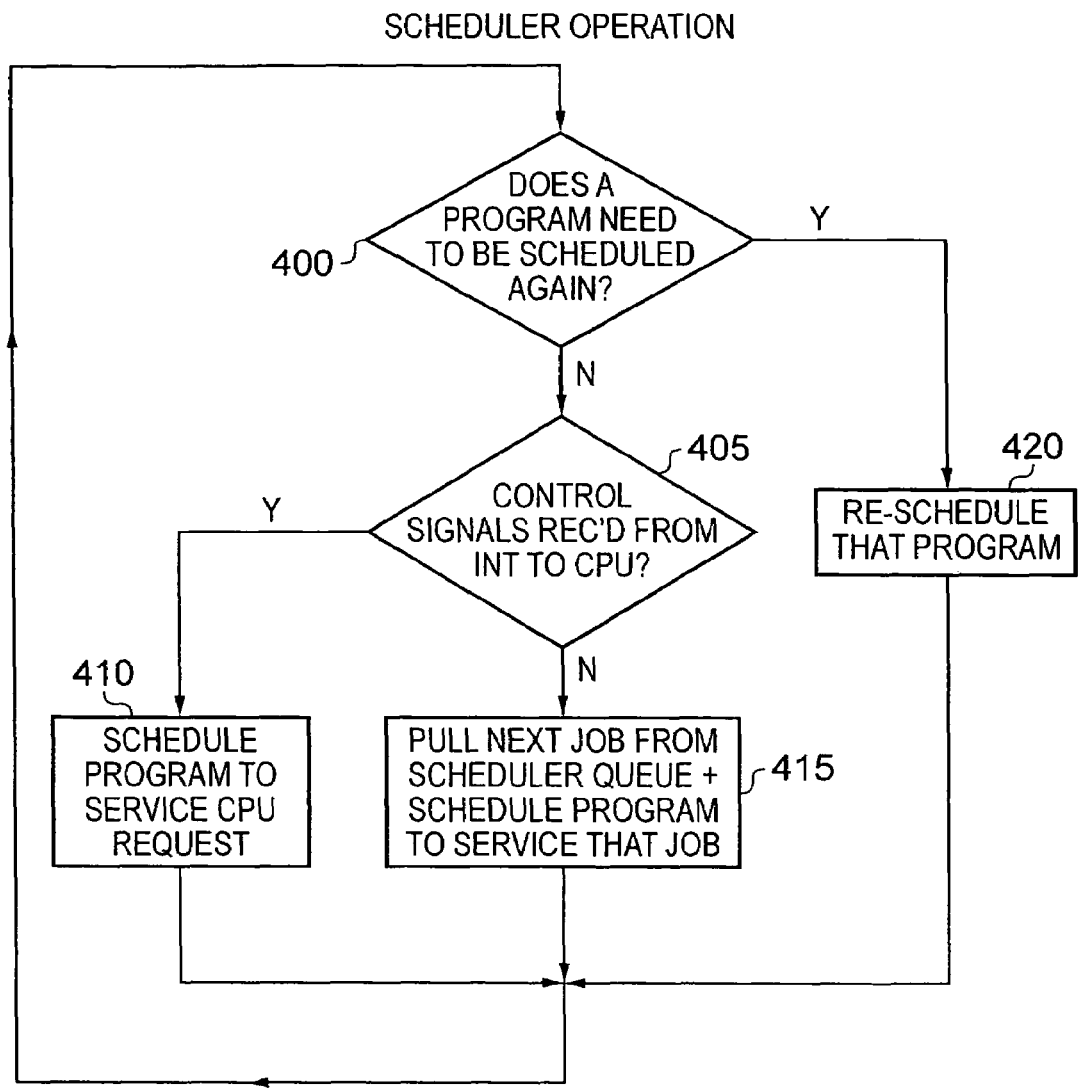
FIG. 5A is a flow diagram illustrating the operation of the scheduler of FIG. 4 in accordance with one embodiment of the present invention.

FIG. 5A is a flow diagram illustrating one way in which the scheduler 320 can be arranged to operate so as to take account of any control signals received via the interface 215. The process illustrated in FIG. 5A will typically be executed each time the scheduler has to make a decision as to the next job to be scheduled into the shader pipeline, and hence for example the process may be performed once each clock cycle. At step 400, the scheduler determines whether there is a program that needs to be rescheduled within the shader pipeline, as for example may be the case if more than one pass of the program through the shader pipeline is necessary in order for a particular pixel colour to be determined. If such a program has reached the end of the shader pipeline and needs rescheduling again, then this will be determined at step 400, and at step 420 that program will be rescheduled.

However, assuming there is not a program that needs to be rescheduled, then the process proceeds to step 405, where it is determined whether any control signals have been received from the CPU via the interface 215. Such control signals will be referred to hereafter as representing a CPU request. Each CPU request may identify one or more processing operations to be performed by the GPU. In one embodiment, as discussed earlier, such operations will typically be tightly coupled with operations performed by the CPU, and hence could not be offloaded to the GPU via the traditional, first, mechanism, due to the high latency of that mechanism. In accordance with the process of FIG. 5A, the scheduler treats any such CPU requests received over the interface as high priority, and accordingly in the presence of any such CPU request, the process branches to step 410, where a program is scheduled to service the CPU request. If there are no CPU requests detected at step 405, then the process proceeds to step 415, where the scheduler 320 pulls the next job from the scheduler queue 315 and schedules a program to service that job.

Figure 5B:
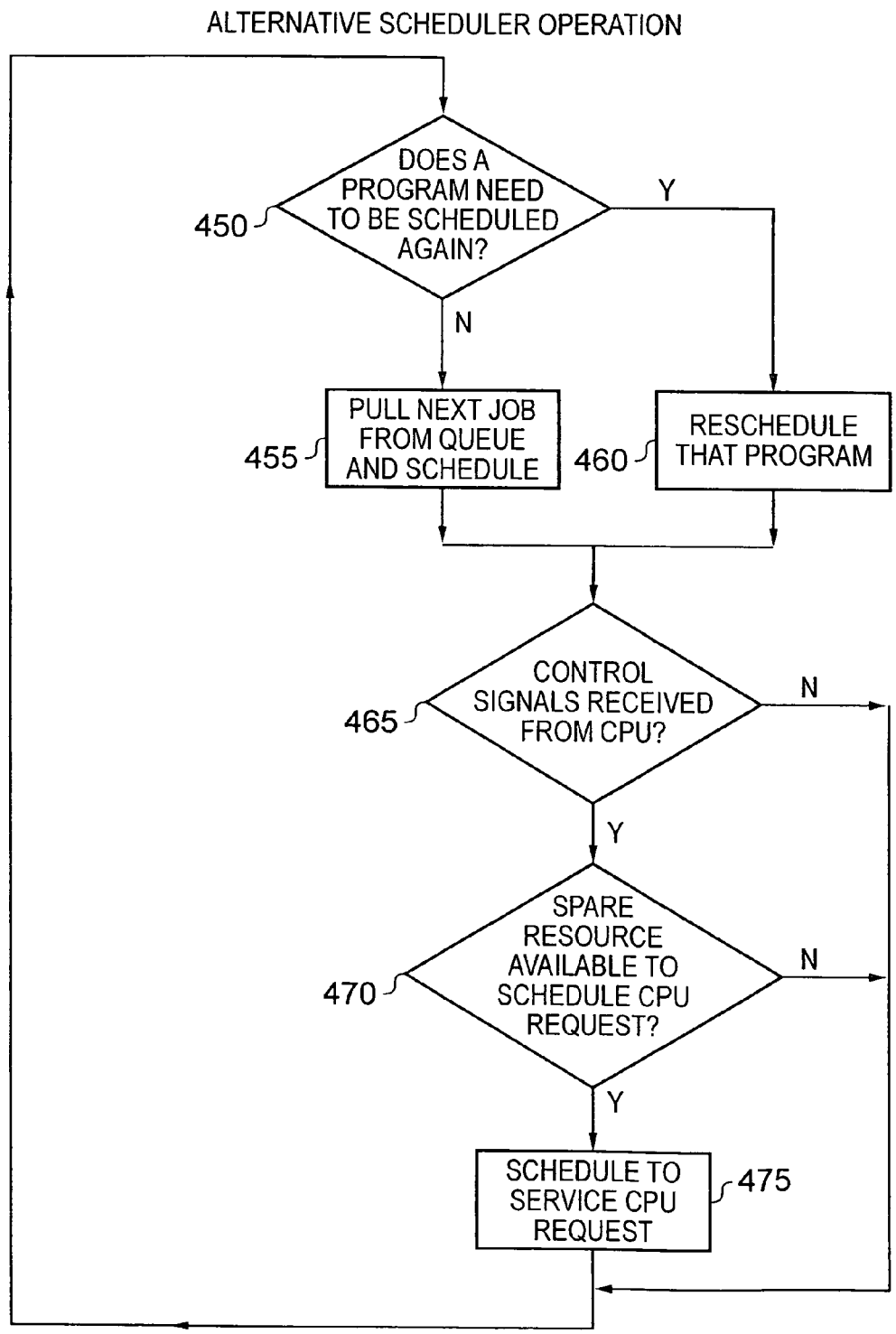
FIG. 5B is a flow diagram illustrating the operation of the scheduler of FIG. 4 in accordance with an alternative embodiment of the present invention.

Whilst the above described mechanism ensures that the CPU requests received via the interface 215 are dealt with quickly by the GPU, in many embodiments it will not be necessary for such CPU requests to be handled quite so invasively to the GPU's normal operation, and instead the scheduler can seek to allocate those CPU requests as and when resources are available within the shader pipeline. FIG. 5B illustrates an alternative sequence of operations that may be performed by the scheduler 320 to implement such a scheme. As with FIG. 5A, the process illustrated by the flow diagram of FIG. 5B will be repeated each time the scheduler needs to schedule a program to the shader pipeline, and hence in one embodiment may be repeated each clock cycle.

At step 450, the scheduler 320 determines whether there is a program that needs to be rescheduled, and if so that program is then rescheduled at step 460. Hence, it will be appreciated that steps 450 and 460 are analogous to steps 400 and 420 discussed earlier with reference to FIG. 5A.

If a program does not need to be rescheduled, then the process proceeds to step 455 where the next job is pulled from the scheduler queue 315 and is scheduled to the shader pipeline 325. Thereafter, or following step 460 in the event that a program is rescheduled, the scheduler 320 determines at step 465 whether any control signals have been received from the CPU, i.e., whether there is a pending CPU request. If not, no further action is required. However, if a CPU request is pending, then the process proceeds to step 470, where the scheduler determines whether there any spare resources within the shader pipeline that would be available to handle the CPU request. If so, then at step 475 those resources are scheduled to service the CPU request, whereas if no spare resources are available no action is taken at this time.

It will be appreciated that the flow diagram of FIG. 5B allows the CPU request received via the interface to be scheduled into the shader pipeline's resources as and when they become available. Assuming that resources within the shader pipeline are likely to become available within a short period of time, then such an approach will allow the CPU requests received via the interface 215 to be handled promptly, and in a very efficient manner since there is little if no impact on the main batch job being performed by the GPU. Since the high setup latency of the first mechanism has been avoided by virtue of injecting the CPU request directly into the GPU via the interface, it is likely that the GPU will be able to handle the CPU request quickly enough to meet the timing requirements of the CPU even when scheduled accordingly to the flow of FIG. 5B rather than the more invasive approach of FIG. 5A.

Figure 6:
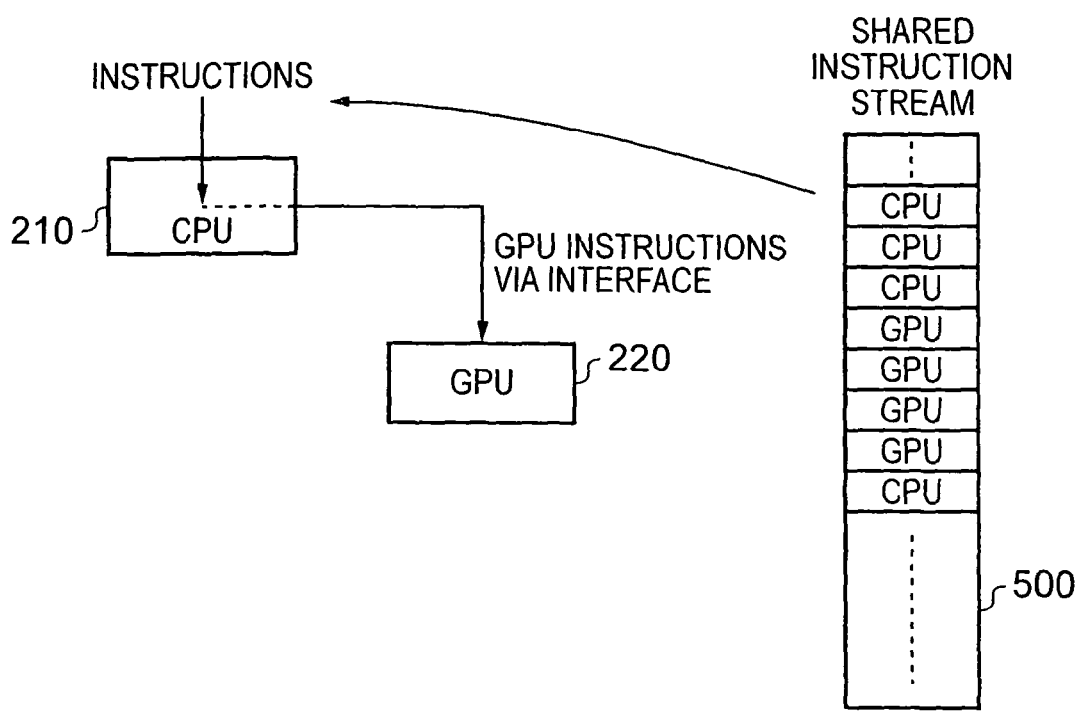
FIGS. 6 to 8 illustrate three different mechanisms that may be used for controlling the GPU via the CPU/GPU interface of embodiments of the present invention.
Figure 7:
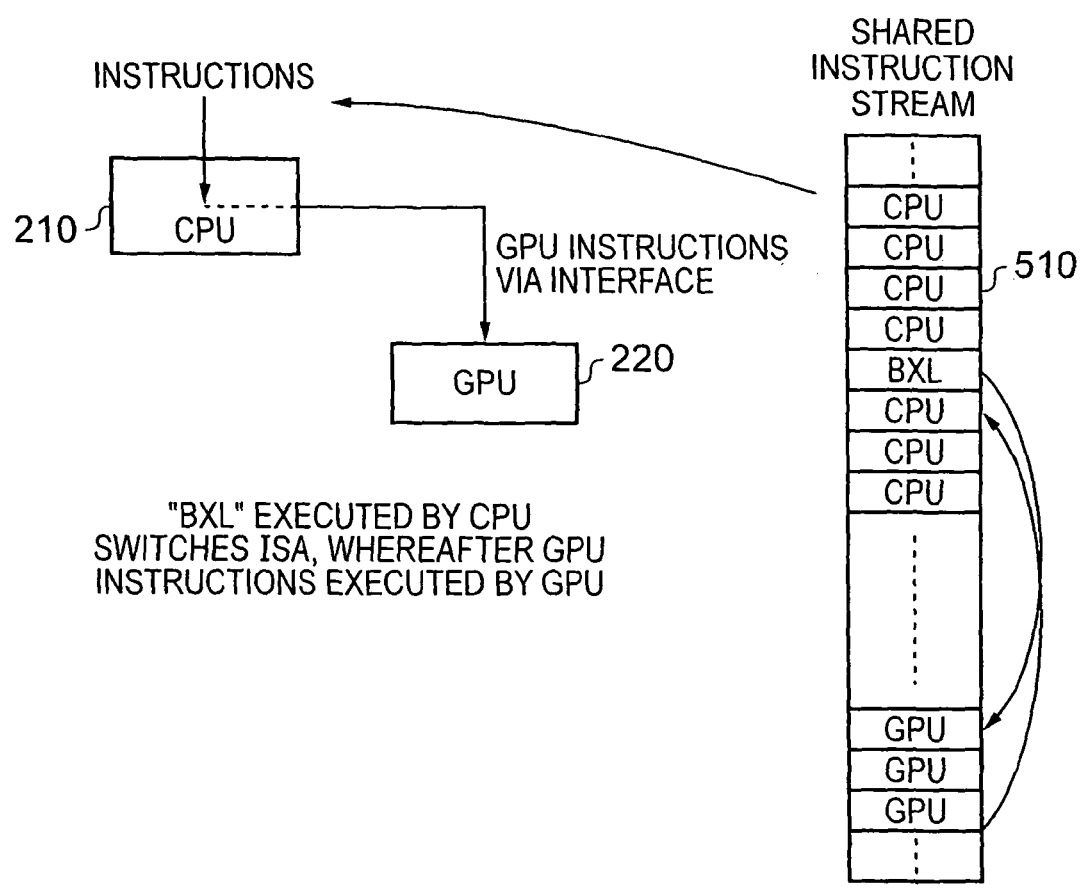
Figure 8:
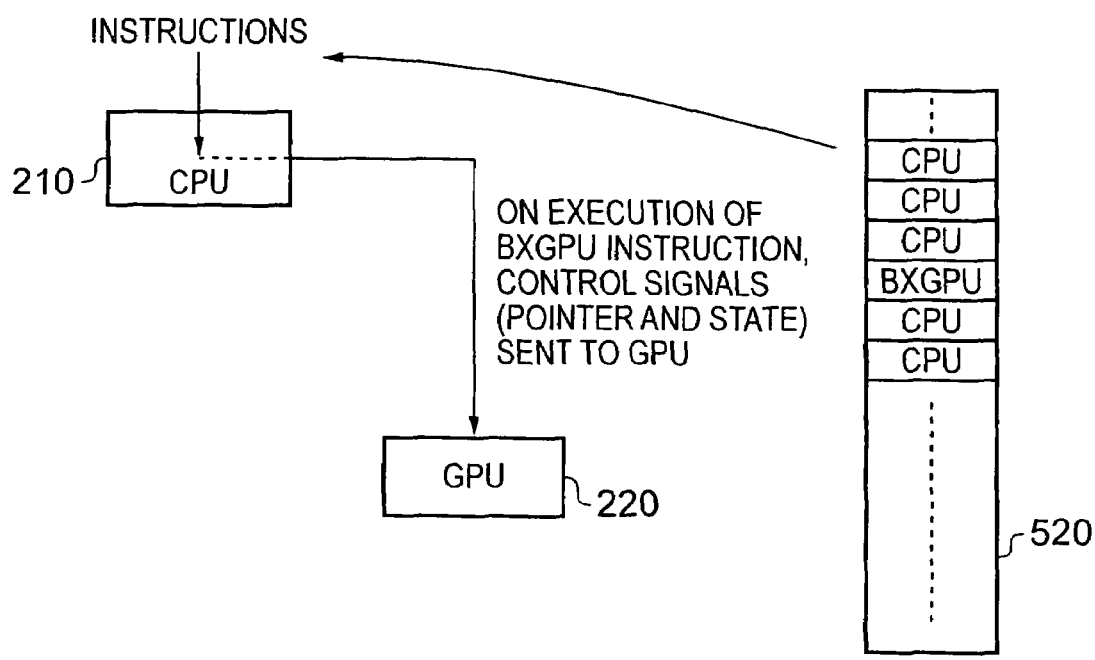

FIGS. 6 to 8 illustrate three alternative mechanisms for controlling the GPU via the interface of embodiments of the present invention. In accordance with the approach shown schematically in FIG. 6, the CPU 210 is arranged to execute a sequence of instructions provided within a shared instruction stream 500. In addition to the usual CPU instructions appearing within that instruction stream, and executed by the CPU 210, there will be a number of GPU instructions whose coding does not overlap with the CPU instruction set, and which accordingly can be recognised by the CPU as GPU instructions during an initial decode phase. Once recognised as GPU instructions, those instructions are passed over the interface 215 to the GPU 220 for execution by the GPU. Often an indication of the GPU instruction will also pass through the CPU pipeline with one or more handshaking signals passing between the CPU and the GPU via the interface 215 during the execution of the GPU instruction within the GPU.

In one particular embodiment of the approach of FIG. 6, when the CPU 210 uses the interface 215 to control the GPU, the manner in which the GPU is controlled can be considered to be analogous to the manner in which ARM's Neon SIMD processing circuitry is controlled by an ARM processor core, a general discussion of ARM's Neon SIMD processing circuitry being described in commonly owned U.S. Pat. No. 7,145,480, the entire contents of which are herein incorporated by reference.

FIG. 7 illustrates an alternative approach, where again a shared instruction stream 510 is executed by the CPU 210, but the CPU and GPU instructions do not have completely unique codings. Instead, the CPU 210 can be arranged to execute a switch instruction to switch from a CPU standard mode of operation to a GPU mode of operation. Following the switch instruction, the subsequent instructions are decoded having regard to the GPU mode of operation. In the example shown in FIG. 7, this switch instruction is referred to as a "BXL" instruction, which in addition to changing the mode of operation causes a branch to take place to a portion of the code stream where a sequence of GPU instructions exist. Whilst it is possible that one or more of the instructions in the sequence may still need to be executed by the CPU, it is envisaged that most of the instructions following the switch will be intended for execution by the GPU, and will accordingly be routed via the interface 215 to the GPU 220 for execution. When the required sequence of GPU instructions have been executed, the process will branch back to the CPU instruction following the BXL instruction, at which point normal CPU mode will be resumed, and subsequent instructions will be decoded and executed as CPU instructions.

There are a number of ways in which the return to the normal CPU mode could be provided. For example, in one embodiment one of the GPU instructions may cause the GPU to change the execution context back to the CPU again. This could either be an explicit BX style instruction, or an instruction that causes a return to a non-GPU address. Alternatively, it may be a special instruction that kills the GPU thread and allows the CPU to continue from the next instruction following the original BXL instruction.

Irrespective of whether the approach of FIG. 6 or the approach of FIG. 7 is used, the instructions that are passed over the interface to the GPU may take a variety of forms. In one embodiment, at least one of the instructions may provide a pointer to one or more data structures in the shared memory. Hence, in such embodiments, an instruction may be directly injected from the CPU to the GPU over the interface, but with the data values then operated on, and optionally identification of the operations to be performed, being provided by one or more data structures in the shared memory.

However, there is no requirement to used shared memory, and instead one or more of the instructions provided over the interface may, when executed on the GPU, cause data to be passed between the register file of the CPU and a register file of the GPU, as for example was discussed earlier with reference to FIG. 3A. Alternatively, as was discussed earlier with reference to FIG. 3B, a shared register file may be provided, and one or more of the instructions routed over the interface may identify the registers of the shared register file to be used by the GPU when performing the required operations.

Additionally, one or more of the instructions may specify the actual data processing operations to be performed by the graphics processing unit, for example arithmetic operations, control flow operations, logical operations, comparison operations, masking operations, etc.

FIG. 8 illustrates an alternative mechanism that may be used, where the instruction stream 520 is not shared, and instead only contains instructions executed by the CPU 210. However, at least one of the instructions executed by the CPU may cause one or more control signals to be sent over the interface to the GPU 220 to initiate one or more operations on the GPU. In the example of FIG. 8, the instruction of this type is referred to as a BXGPU instruction, which when executed causes the CPU to generate one or more control signals for passing to the GPU 220, whereafter execution of the CPU stalls. The control signals may in one embodiment provide a pointer to one or more data structures in the shared memory, and may also provide various state information required to configure the GPU for the operations to be performed. On receipt of these control signals, the GPU will schedule the required tasks, for example using the earlier described mechanisms of FIG. 5A or 5B, and on completion will issue an interrupt signal over path 250. The CPU will then respond to the interrupt by executing an interrupt service routine in order to retrieve the result data from the GPU (which may for example be stored in the shared memory, or may have been stored directly in the CPU register file via the interface). Then the CPU will resume execution of the sequence of instructions 520 starting with the instruction immediately following the BXGPU instruction.

From the above description of embodiments of the present invention, it will be seen that through the use of the interface 215 of such embodiments, a technique is provided for close coupling of a CPU and GPU in a System on Chip environment, so that CPU centric code can take advantage of the GPU hardware for certain tasks without incurring the setup overhead associated with more traditional operations offloaded to the GPU. In one embodiment both the CPU and GPU can execute from a common instruction stream managed by the CPU, with the communication mechanism seeking to minimise task switching or communication overhead or penalty.

The embodiments of the present invention provide the ability to allow the retargeting of critical code sections which can be accelerated and easy absorbed into latent GPU compute capacity from a single execution thread, increasing the overall capabilities of the GPU/CPU components beyond that reachable through shared memory interaction.

In one embodiment of the present invention, when the interface mechanism is used, the use of shared memory for communication between the CPU and GPU can be avoided, or at least significantly reduced. In one embodiment, data can be passed directly via the interface between a register file of the CPU and a register file of the GPU, or alternatively a shared register file can be used. Considering one particular embodiment where a shared register bank is used, then if the CPU 210 employs a Neon architecture such as described in the earlier-mentioned U.S. Pat. No. 7,145,480, then the SIMD register bank provided for the Neon functionality may be allocated as the register bank to be shared with the GPU, since the number, width and natural arrangement of the Neon register bank make it more likely that register bank will contain the data which the GPU needs to operate on. For example, game engine artificial intelligence and physics code and data representation lends itself well to Neon, and with the ability to offload certain functions to the GPU using the interface mechanism of the present invention, this could provide significant improvements in processing capability. In such embodiments, the CPU-side Neon registers could be used for the primary input and final output registers, whilst working registers within the GPU could be used for intermediate results and temporary values. Such an approach would help to reduce micro architectural complexity.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus comprising:
a central processing unit (CPU) for executing a stream of instructions;
a graphics processing unit (GPU) for performing graphics processing operations on behalf of the CPU;
shared memory accessible by the CPU and the GPU via which data structures are shareable between the CPU and the GPU;
a bus via which the CPU, GPU and shared memory communicate, the CPU routing control signals via the bus as a first mechanism for controlling the GPU; and
an interface between the CPU and the GPU, the CPU providing control signals over the interface as an additional mechanism for controlling the GPU, said GPU including a scheduler for controlling a shader pipeline of the GPU to perform said graphic processing operations, said interface providing a control path via which the control signals issued by the CPU are directly injected into the scheduler of the GPU when using said additional mechanism, in order to cause processing operations defined by those control signals to be scheduled for execution within the shader pipeline, wherein said CPU is configured to use:
said first mechanism to control the GPU to perform graphics processing operations which are loosely coupled with operations performed by the CPU; and
said additional mechanism to control the GPU to perform processing operations which are tightly coupled with operations performed by the CPU.

2. A data processing apparatus as claimed in claim 1, wherein the control signals provided over the interface when employing the additional mechanism comprise one or more instructions to be executed by the GPU.

3. A data processing apparatus as claimed in claim 2, wherein said one or more instructions are contained within said stream of instructions and recognised by the CPU as instructions to be handled by the GPU.

4. A data processing apparatus as claimed in claim 2, wherein prior to providing said one or more instructions over said interface, the CPU executes a switch instruction to switch from an instruction set used by the CPU to an instruction set used by the GPU, such that subsequent instructions in said stream are interpreted as instructions to be handled by the GPU.

5. A data processing apparatus as claimed in claim 2, wherein at least one of said one or more instructions is an instruction providing a pointer to one or more data structures in said shared memory.

6. A data processing apparatus as claimed in claim 2, wherein at least one of said one or more instructions is an instruction which when executed causes data to be passed between a register file of the CPU and a register file of the GPU.

7. A data processing apparatus as claimed in claim 2, wherein at least one of said one or more instructions specifies a data processing operation to be performed by the GPU.

8. A data processing apparatus as claimed in claim 1, wherein the control signals provided over the interface when employing the additional mechanism result from execution of at least one instruction by said CPU.

9. A data processing apparatus as claimed in claim 8, wherein said control signals provide a pointer to one or more data structures in said shared memory defining the processing operations to be performed by the GPU.

10. A data processing apparatus as claimed in claim 1, wherein the CPU and GPU are arranged to share a register file and said control signals provided over the interface when employing the additional mechanism specify one or more of the registers of the shared register file to be used by the GPU when performing processing operations defined by said control signals.

11. A data processing apparatus as claimed in claim 10, wherein the CPU is arranged to identify in scoreboard circuitry those registers specified in the control signals as being for use by the GPU, to prevent those register being used by the CPU whilst the GPU is performing the processing operations defined by said control signals.

12. A data processing apparatus as claimed in claim 1, wherein whilst the GPU is performing processing operations defined by said control signals provided over the interface in accordance with the additional mechanism, the CPU continues to execute instructions that are not dependent on the results of said processing operations performed by the GPU.

13. A data processing apparatus as claimed in claim 1, wherein following the provision of said control signals over the interface in accordance with the additional mechanism, the CPU halts execution of instructions until the results of the processing operations performed by the GPU in response to said control signals are available to the CPU.

14. A data processing apparatus as claimed in claim 1, wherein:
the GPU supports multi-threaded execution, and said scheduler is configured to schedule threads within the GPU;
upon receipt by the GPU of said control signals via the interface, the scheduler being arranged to schedule at least one thread for the processing operations associated with those control signals.

15. A data processing apparatus as claimed in claim 14, wherein the scheduler is arranged to give higher priority to any thread associated with said control signals received via the interface than the priority given to other threads.

16. A data processing apparatus as claimed in claim 14, wherein the scheduler is arranged to schedule any thread associated with said control signals received via the interface in a manner seeking to utilise any free computation capabilities of the GPU.

17. A data processing apparatus as claimed in claim 1, wherein when employing the first mechanism, the control signals routed via the bus cause control values to be written into memory-mapped control registers of the GPU in order to control the GPU.

18. A data processing apparatus comprising:
a central processing means (CPM) for executing a stream of instructions;
a graphics processing means (GPM) for performing graphics processing operations on behalf of the CPM;
shared memory means, accessible by the CPM and the GPM, for sharing data structures between the CPM and the GPM;
bus means for communication between the CPM, GPM and shared memory means, the CPM for routing control signals via the bus means as a first mechanism for controlling the GPM; and
an interface means between the CPM and the GPM, the CPM for providing control signals over the interface means as an additional mechanism for controlling the GPM said GPM including a scheduler means for controlling a shader pipeline of the GPM to perform said graphic processing operations, said interface means providing a control path via which the control signals issued by the CPM are directly injected into the scheduler means of the GPM when using said additional mechanism, in order to cause processing operations defined by those control signals to be scheduled for execution within the shader pipeline, wherein said CPM is configured to use:
said first mechanism to control the GPM to perform graphics processing operations which are loosely coupled with operations performed by the CPM; and
said additional mechanism to control the GPM to perform processing operations which are tightly coupled with operations performed by the CPM.

19. A method of operating a data processing apparatus comprising a central processing unit (CPU) for executing a stream of instructions, and a graphics processing unit (GPU) for performing graphics processing operations on behalf of the CPU, the method comprising the steps of:
employing shared memory accessible by the CPU and the GPU in order to share data structures between the CPU and the GPU;
providing a bus via which the CPU, GPU and shared memory communicate;
routing control signals from the CPU via the bus as a first mechanism for controlling the GPU;
providing an interface between the CPU and the GPU; providing control signals from the CPU over the interface as an additional mechanism for controlling the GPU;
employing a scheduler within said GPU to control a shader pipeline of the GPU to perform said graphic processing operations;
providing a control path within the interface via which the control signals issued by the CPU are directly injected into the scheduler of the GPU when using said additional mechanism, in order to cause processing operations defined by those control signals to be scheduled for execution within the shader pipeline, wherein said CPU is configured to use:
said first mechanism to control the GPU to perform graphics processing operations which are loosely coupled with operations performed by the CPU; and
said additional mechanism to control the GPU to perform processing operations which are tightly coupled with operations performed by the CPU.

* * * * *